United States Patent [19]
Tabler

[11] 3,737,954
[45] June 12, 1973

[54] CONNECTOR FOR FLEXIBLE BELTS

[76] Inventor: Charles P. Tabler, 2560 Rosary Circle, Hamilton, Ohio 45013

[22] Filed: Oct. 19, 1970

[21] Appl. No.: 81,995

[52] U.S. Cl. .................................. 24/31 C, 198/82
[51] Int. Cl. .............................................. F16g 3/07
[58] Field of Search ................... 74/231 J, 232, 233, 74/234, 237; 198/82; 24/35, 36, 31, 33, 31 C

[56] References Cited
UNITED STATES PATENTS

| | | | |
|---|---|---|---|
| 3,445,899 | 5/1969 | Koga | 24/37 |
| 184,654 | 11/1876 | Niemann | 24/31 H |
| 399,962 | 3/1889 | Avery | 24/33 B |
| 1,495,228 | 5/1924 | Koenemann | 24/232 UX |
| 2,099,831 | 11/1937 | Taber | 24/33 M |
| 3,252,563 | 5/1966 | Juengel | 198/82 |

FOREIGN PATENTS OR APPLICATIONS

| | | | |
|---|---|---|---|
| 612,221 | 4/1935 | Germany | 24/33 B |
| 194,486 | 3/1923 | Great Britain | 24/33 M |

*Primary Examiner*—Donald A. Griffin
*Attorney*—J. M. Cantor

[57] ABSTRACT

A connector for belt ends for belt conveyors in which a belt is guided by a tube. A clamp member is secured to each end of the belt and a hinge pivotally connects the clamps. The clamps are provided with long sharp barbs which spread the reenforcing cords of the belt as the barbs penetrate the belt on assembly to thereby reduce the number of cords which are cut during the application of the clamp members. The legs of the clamp are formed as arcs of a curve with a long radius to provide minimum friction and erosion of the conveyor tube.

7 Claims, 5 Drawing Figures

3,737,954

INVENTOR.
CHARLES P. TABLER
BY
Harold L. Halpert
AGENT

CONNECTOR FOR FLEXIBLE BELTS

This invention relates to a belt conveyor and more particularly to a clamp for connecting the ends of a flexible strip to form an endless belt for conveying articles. A conveyor of this general type is disclosed in the U.S. Pat. No. 3,252,563 to Victor A. Juengel wherein one run of the belt is carried in a groove in one surface of the tube and the return run is in the tube.

Conveyors of the general type disclosed in the Juengel patent are limited in both length and load carrying capacity by the clamping structure connecting the ends of the strip to form the endless belt.

It is an object of this invention to provide a fastener that has a high tensile strength.

It is a further object of this invention to provide a fastener as aforesaid which has a smooth rubbing surface for contact with the mounting tube of a conveyor.

It is a further object of this invention to provide a fastener as aforesaid which can be easily applied.

These and other objects of the invention will become manifest upon reading the following description in conjunction with the accompanying drawing wherein:

FIG. 1 discloses a perspective view of the belt and fastener of this invention as applied to the tube of the conveyor.

FIG. 2 discloses details of the fastener.

Figures 1, 2:
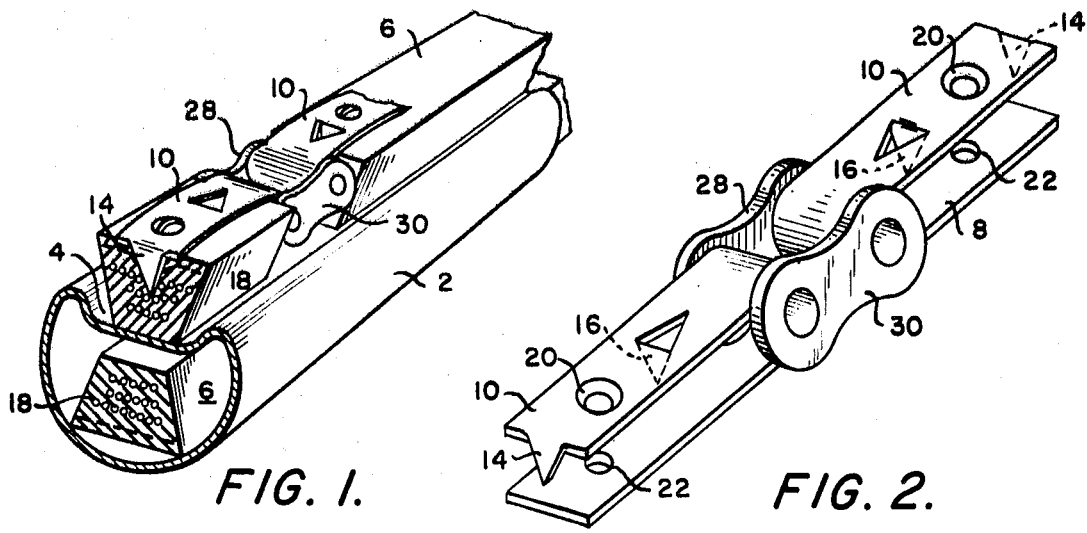

In accordance with the invention a clamp member having barbs on one surface is applied to each end of the belt with the barbs penetrating the belt and with the bight of the clamp around a hinge member. A screw extending through the clamp member and belt is threaded into one leg of the clamp to cause the legs to become arcs of a long curve. The curvature of the legs is such as to permit the end of the screw to be peened with the peened portion recessed sufficiently to avoid contact with the tube.

With reference to the drawing there is disclosed a tube 2 such as in the aforementioned Juengel patent or as disclosed in the application of Andrew T. Kornylak for an ELASTIC BELT CONVEYOR filed June 10, 1970 and assigned Ser. Number 42,094. The tube is formed with a depressed portion 4 forming a guiding track for one run of a belt 6. The return run is carried in the tube. A power source (not shown) in the form of a V pulley at one or both ends of the tube drives the belt along the tube to transport an article carried on the upper surface.

The ends of the belt are connected by a pair of clamps connected by a hinge structure.

Each clamp comprises a pair of legs 8,10 connected by a circular bight portion 12. The leg 10 is formed with triangular barbs 14 and 16 having a sharp penetrating edge which serves to spread the reenforcing cords 18 as the barb penetrates the belt. Each barb is at least as long as the radius r of the bight portion 12. An opening 20 is formed between the barbs to receive a threaded fastener. A threaded opening 22 is formed in the leg 8 for engagement by the threads of a fastener.

The clamps are pivotally connected by a hinge structure comprising a pair of pins 24,26 connected by links 28,30.

Figure 3:
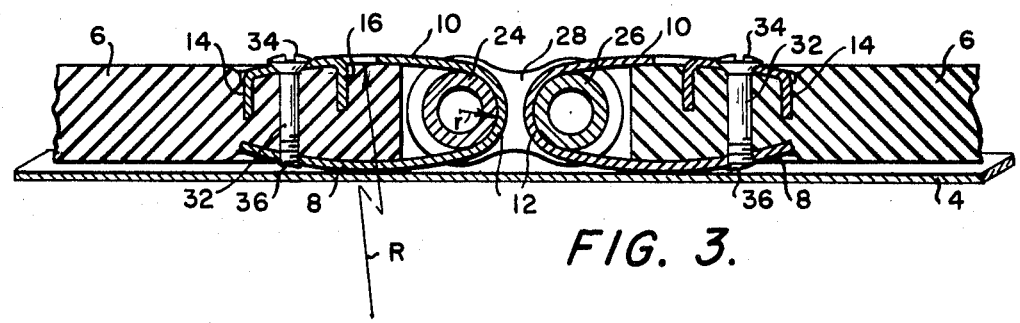
FIG. 3 is a longitudinal section through the belt and fastener.
Figure 4:
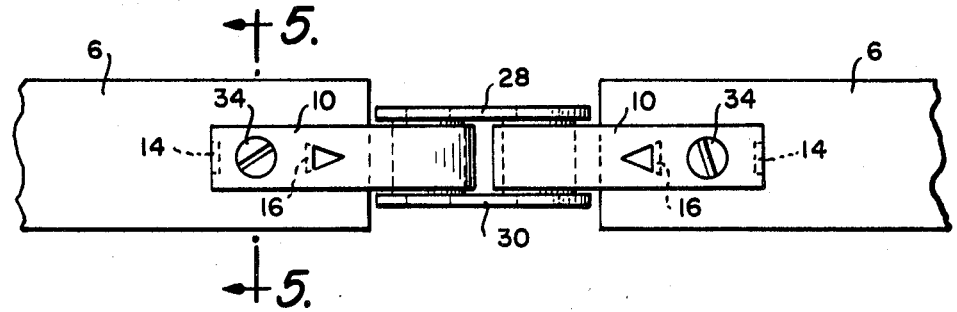
FIG. 4 is a plan view of the end sections of the belt and fastener.
Figure 5:
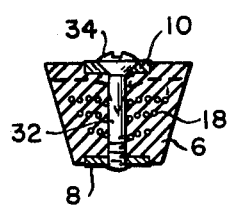
FIG. 5 is a section taken on the line 5—5 of FIG. 4.

For purposes of assembly the clamps are formed with the legs spread apart sufficiently to allow one leg to be fitted around a pin and to receive the end of the belt. The legs are then pressed together to cause the barbs to penetrate the belt. A threaded fastener 32 having a head 34 is passed through opening 20, through an opening formed in the belt and into threaded engagement with the threaded opening 20. Rotation of the fastener will draw the ends of the legs together and cause the legs to curve and form arcs having a long radius R. The sharp end of the fastener is then peened to form a retaining head 36 as illustrated at the right of FIG. 3. The curvature of the leg is such that head 36 is spaced from the surface 4 and the only contact with surface 4 is along the long curve of the leg 8.

While I have disclosed the legs of the clamp to be formed into arcs having a long radius during assembly it is to be understood that the legs can be formed along arcs of long radius before assembly.

The long lengths of the barbs and the deep indentation of the ends of the legs into the belt provide a fastener that has a tensile strength equal to that of the belt.

I claim:

1. A connector for belt ends comprising a pair of clamps and means pivotally connecting the clamps together, each clamp comprising a pair of legs connected by a circular bight portion, a pair of barbs at one end of one of the legs, and opposed openings in the end portions of each leg for reception of a fastener for securing the ends together, the length of each barb being equal to the radius of the circular bight portion, further including a fastener extending through the openings to urge the legs into compressing engagement with the end of the belt, at least one end of said fastener being substantially flush with its associated leg, the legs of each clamp being curved on a long radius with the maximum distance between the outer surfaces of the legs being greater than the thickness of the belt.

2. A connector as defined in claim 1 wherein the barbs are longitudinally spaced on oppose sides of one of said openings.

3. A connector as defined in claim 2 wherein the barbs are triangular with a sharp penetrating edge.

4. A connector as defined in claim 3 wherein the means pivotally connecting the clamps together comprises a pair of cylindrical pins and links connecting the pins, the bight portion of each clamp being pivoted on a pin.

5. A connector as defined in claim 1 wherein the fastener is threaded through one leg and is formed with a head at each end, the distance between the outer surfaces of the heads being less than the maximum distance between the outer surfaces of the legs.

6. A method of connecting the ends of flexible belts of compressible material which comprises the steps of:
   a. providing a connector comprising a pair of clamps pivotally connected together, each clamp having a pair of confronting legs connected by a circular bight portion, one leg of each clamp having a pair of inwardly extending barbs adjacent the free end thereof and opposed axial openings in each of said pair of legs, one opening in each said pair of legs being positioned between said barbs,
   b. placing each clamp of said connector over respective opposite ends of a belt,
   c. placing a fastener through said openings and d. moving said legs of said clamps together along the axes of said openings by operation of said fastener to provide a curvature in said legs to locate the free ends of the legs closer to each other than at the bight, wherein said curvature is such that said legs extend outwardly beyond the ends of said fastener.

7. A method of connecting the ends of flexible belts of compressible material which comprises the steps of:
 a. providing a connector comprising a pair of clamps pivotally connected together, each clamp having a pair of confronting legs connected by a circular bight portion, one leg of each clamp having a pair of inwardly extending barbs adjacent the free end thereof and opposed axial openings in each of said pair of legs, one opening in each said pair of legs being positioned between said barbs,
 b. placing each clamp of said connector over respective opposite ends of a belt,
 c. placing a fastener through said openings and
 d. moving said legs of said clamps together along the axes of said openings by operation of said fastener to provide a curvature in said legs to locate the free ends of the legs closer to each other than at the bight, futher including the step of peening said fastener substantially flush with said legs subsequent to step (d), wherein said curvature is such that said legs extend outwardly beyond the ends of said fastener.

* * * * *